United States Patent [19]

Stetson et al.

[11] Patent Number: 4,639,593
[45] Date of Patent: Jan. 27, 1987

[54] AIRFLOW DETECTION SYSTEM USING FIBER OPTICS

[75] Inventors: Karl A. Stetson, Coventry, Conn.; John Palecki, Northampton, Mass.

[73] Assignee: United Technologies Corporation, Hartford, Conn.

[21] Appl. No.: 665,845

[22] Filed: Oct. 29, 1984

[51] Int. Cl.[4] .......................... H01J 5/14; G01D 5/30; G01L 11/00; G01F 1/66
[52] U.S. Cl. ............................... 250/227; 250/231 P; 73/702; 73/861.21
[58] Field of Search ................ 73/702, 703, 704, 705, 73/651, 653, 655, 861.21; 455/612; 250/231 P, 231 R, 227; 370/3

[56] References Cited

U.S. PATENT DOCUMENTS

| | | | |
|---|---|---|---|
| 4,293,188 | 10/1981 | McMahon | 350/96.29 |
| 4,307,618 | 12/1981 | James et al. | 73/861.21 |
| 4,358,954 | 11/1982 | de Jong | 73/861.21 |
| 4,359,637 | 11/1982 | Perren | 250/231 R |
| 4,360,247 | 11/1982 | Beasley | 350/96.15 |
| 4,501,157 | 2/1985 | Perkinson et al. | 73/861.24 |
| 4,525,818 | 6/1985 | Cielo et al. | 73/655 |
| 4,543,961 | 10/1985 | Brown | 250/231 P |
| 4,560,016 | 12/1985 | Ibanez et al. | 250/227 |

FOREIGN PATENT DOCUMENTS 0077345 5/1983 Japan ........................................ 370/3

OTHER PUBLICATIONS

Davis, C. M., "An Introduction to Fiberoptic Sensors", *Laser Focus/Fiberoptic Technology*, vol. 18, No. 2, Feb. 1982, pp. 112-115.
Giallorenzi, T. G., "Fibre Optic Sensors", *Optics and Laser Technology*, vol. 13, No. 2, Apr. 1981, pp. 73-78.
Gottlieb, M. and Brandt, G. M., "Temperature Sensing in Optical Fibers Using Cladding and Jacket Loss Effects", *Applied Optics*, vol. 20, No. 22, Nov. 15, 1981, pp. 3867-3873.
Korth, H., "Integrated Optical Force and Stress Sensor", *IBM Disclosure Bulletin*, vol. 24, No. 2, Jul. 1981, pp. 893-894.

Primary Examiner—Edward P. Westin
Assistant Examiner—Charles Wieland
Attorney, Agent, or Firm—J. Kevin Grogan

[57] ABSTRACT

An airflow detection system comprising a light source for generating an optical signal that is propagated in an optical guide having a plurality of sensors responsive to the presence of airflow, each of which modulates the intensity of the optical signal at a frequency characteristic of that sensor such that a detection apparatus can receive the optical signal and identify activated sensors using frequency domain multiplexing techniques.

8 Claims, 7 Drawing Figures

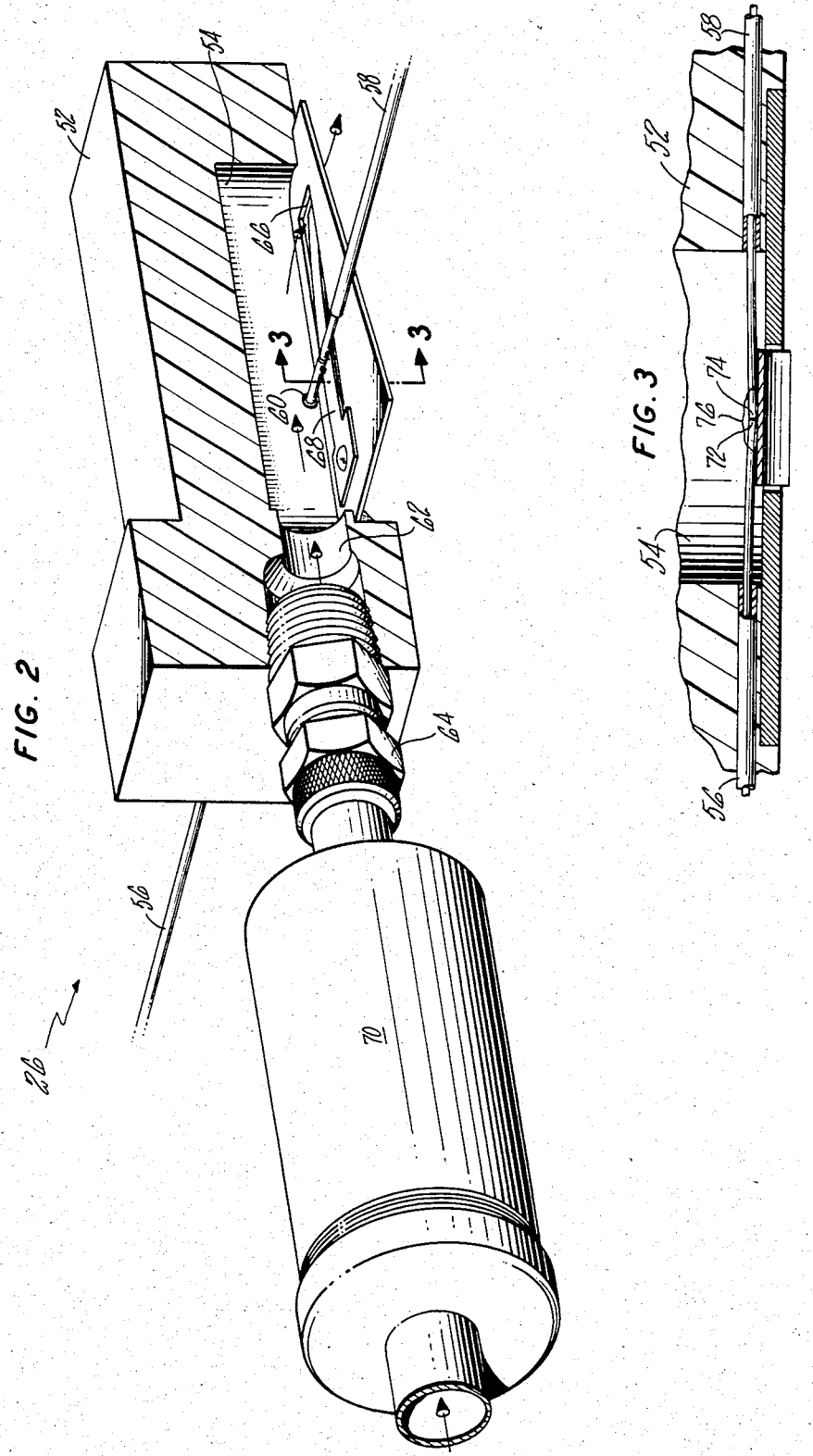

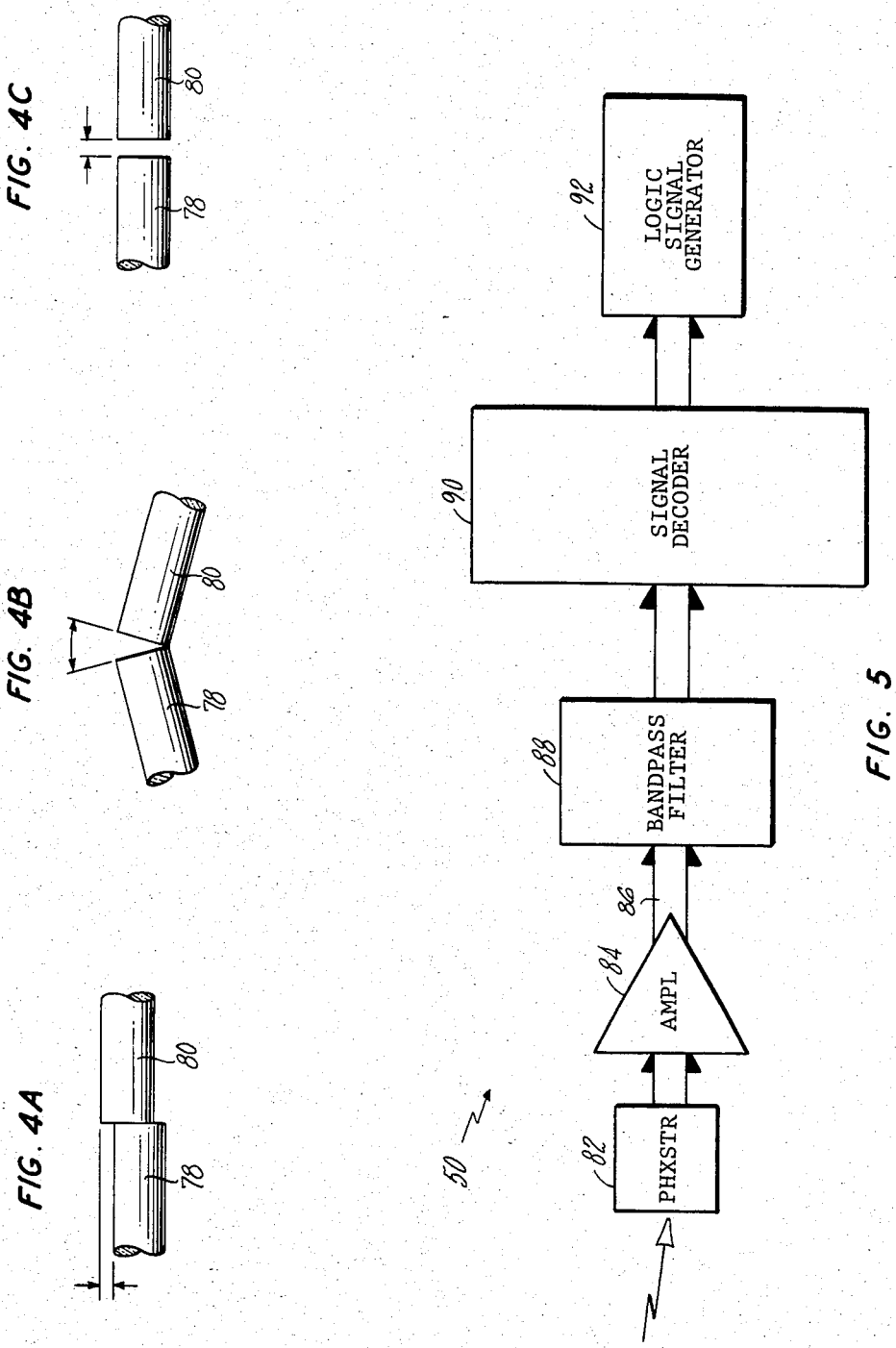

AIRFLOW DETECTION SYSTEM USING FIBER OPTICS

TECHNICAL FIELD

This invention relates to fluid flow detection devices and more particularly to airflow detection systems using fiber optic sensors.

BACKGROUND ART

In the past few years rising costs have prodded building systems engineers to devise more efficient systems to control heating and cooling in office buildings. One approach, well known in the art, employs a single air handling system common to several tenants from which conditioned air can be obtained as needed. In such a system a method must be devised that accurately apportions cost among tenants according to actual consumption. Consequently, the control system must detect the movement of air in each plenum.

A conventional approach involves an airflow detection scheme with sensors placed locally to determine when airflow occurs in an individual plenum. The traditional sensors employed have been transducers which detect airflow and convert mechanical motion into an electrical signal.

The choice of mechanical to electrical transducers places constraints on any overall control device. A significant amount of electrical power is required to keep each sensor operational, with the required power increasing with increasing numbers of sensors. These sensors are susceptible to standard environmental constraints including the effects of temperature, moisture, and breakdowns in electrical insulation. In addition, conventional copper wire occupies a significant amount of space in building service cores.

A most significant drawback to a system using these sensors is that each sensor must be electrically wired in parallel. Although serial wiring of sensors requires less than half of the cable needed for parallel wiring, an array of traditional mechanical to electrical transducers could be rendered useless if one should fail. Consequently, a parallel sensor array with at least two wires per sensor is mandated. Logistically this arrangement becomes quite cumbersome with large numbers of sensors.

Another detection apparatus employs an optical fiber as the means for conveying sensor information. Optical fibers have the advantages that they are light, less bulky, require less space, and are less subject to environmental intererence than their copper wire counterparts. However, schemes currently outlined for transducing airflow information onto a propagating light signal requires an elaborate or costly transducer. Indirect transducers would entail a mechanical to electrical transducer in conjunction with one that transduces the electrical signal to an optical one. In addition, such a transducer still requires parallel wiring to avoid the inherent potential system failure that accompanies serial sensor configurations.

Direct mechanical to optical transducers such as one using a microbending technique as disclosed in U.S. Pat. No. 4,463,254 are not amenable to detect sensitive airflow movement without elaborate modification.

DISCLOSURE OF INVENTION

The object of the present invention is to provide an optical airflow sensor for detecting airflow in a plenum. Another object is to provide an airflow detection system having optical sensors connected in series, each detecting airflow in a separate plenum, to provide a common optical signal indication of the presence and absence of airflow in the plenum associated with each sensor.

According to the present invention, an airflow sensor comprises a cantilevered member subject to airflow in the plenum, and two fiber optic sections fastened end to end to a surface of the member, with substantial optical alignment of the fiber ends in the absence of member movement, whereby the intensity of an optical signal propagating through the fiber optic sections is modulated by the relative movement of the end faces due to oscillation of the cantilevered member in response to the movement of air in the plenum. In further accord with the present invention, the cantilevered member comprises a vibrating reed having a characteristic frequency, whereby the optical signal through the fiber optic sections is modulated at the characteristic frequency of the reed.

According to another aspect of the present invention, an airflow detection system comprises a series connected plurality of optical sensors, each providing characteristic frequency modulation of the common optical signal in response to airflow in a plenum associated with the sensor and a plurality of frequency filters, each tuned to the characteristic frequency of one of the optical sensors, for detecting the presence of the sensor characteristic frequency in the common optical signal.

These and other objects, features and advantages of the present invention will become more apparent in light of the following detailed description of a best mode embodiment thereof, as illustrated in the accompanying Drawing.

BRIEF DESCRIPTION OF DRAWING

FIG. 2 is an illustration partially in perspective and partially in section of an airflow sensor used in the airflow detection system embodiment of FIG. 1;

FIG. 3 is a perspective illustration in section of a portion of the airflow sensor of FIG. 1;

FIG. 4 (A, B & C) is a simplified diagram of three of the displacement characteristics of an optical guide of the airflow sensor of FIG. 3;

FIG. 5 is a detailed block diagram of the detection apparatus for use with the airflow detection system of FIG. 1.

BEST MODE FOR CARRYING OUT THE INVENTION

Figure 1:
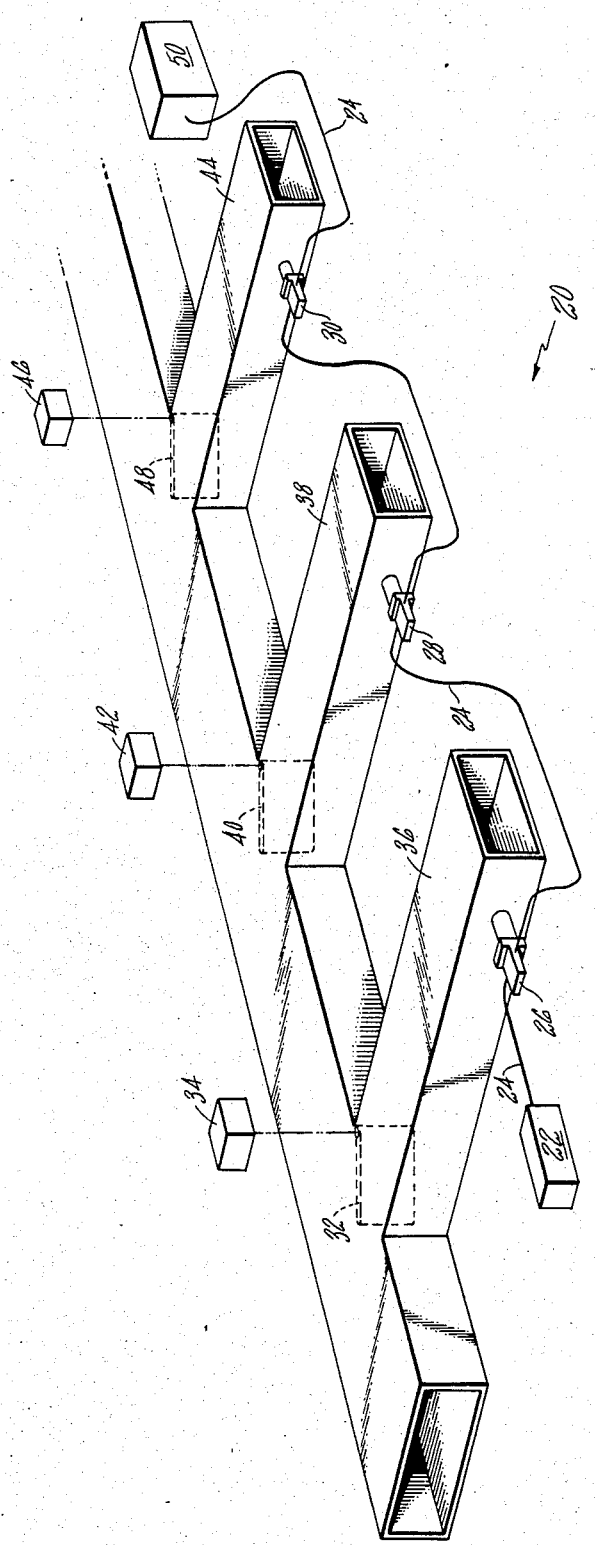
FIG. 1 is a simplified perspective drawing of a best mode embodiment of an airflow detection system according to the present invention.

FIG. 1 is a simplified perspective drawing of an airflow detection system 20 of the present invention for use in heating, ventilating and air conditioning systems. Light source 22 is attached and positioned by techniques well known in the art to one end of an optical guide 24. The light source may be of a type known in the art such as a light emitting diode having several milliwatts of output power. The optical signal emitted from the light source can have any degree of coherence or incoherence. The light signal is not limited to any polarization, and should be of an intensity sufficient to be detectable by techniques known in the art after incurring the losses in transversing the optical guide. In the best mode, the optical guide comprises an optic fiber such as a MAXLIGHT ® No. NF00401 400 micron core glass fiber. Those skilled in the art will note that the optic guide can be of any material, glass or plastic, and can have an arbitrary index of refraction profile across the optical guide.

The optical signal launched in the optic fiber propagates in the fiber serially through each of a plurality of airflow sensors 26, 28, 30 that are positioned in each of a like plurality of air plenums. Sensors 26, 28, and 30 are illustrated, but those skilled in the art will observe that a greater or lesser number could be employed.

Flow regulator 32 and thermostat 34 control the volume of air that is drawn through plenum 36. A fraction of the airflow passes through flow sensor 26. As hereinafter detailed in FIG. 2, air motion through the flow sensor is transduced by a displacement generator into intensity modulation of a set frequency in the optical signal propagating down the optic fiber.

Air in plenum 38 is passed through flow sensor 28 in response to independent demand from flow regulator 40 and thermostat 42. Similarly, air is drawn through plenum 44 in response to demand from thermostat 46 and flow regulator 48. Air movement through flow sensors 28 and 30 impress additional intensity modulations on the propagating optical signal in the manner of sensor 26. These additional modulations are at frequencies characteristic of those specific sensors.

The intensity modulation provided by each sensor is added linearly to those preceding it. Those sensors that are not activated by airflow passively transmit the signal. Moreover, if a sensor fails it will cease to modulate the light signal but not block its transmittance. Detection apparatus 50 receives the modulated optical signal by methods known in the art.

The modulated optical signal is converted into a corresponding modulated electrical signal. Well known frequency domain multiplexing techniques can be used to separate out the contributions in the modulated signal provided by each of the individual flow sensors.

FIG. 2 is a view partially in perspective and partially in section of a flow sensor 26 used in the airflow detection system of FIG. 1. Displacement generator 52 has an inner chamber 54 with four apertures to its exterior. Two of these apertures are positioned so that optic fiber sections 56 and 58 can enter the displacement generator and pass into the inner chamber. Only aperture 60 is illustrated in FIG. 2. The third aperture 62 allows the coupler 64 to be fastened to the displacement generator and provides for air movement into the displacement generator. The fourth aperture 66 in the chamber allows the air to exit the displacement means. Cantilevered member 68 is positioned slightly above the plane of the exit aperture. The dimensions of the cantilevered member and the exit aperture are chosen such that the aperture is slightly larger in size than the cantilevered member. In the best mode embodiment the displacement generator and cantilevered member are an acoustic shallot and an acoustic reed respectively.

Optic fiber sections 56 and 58 each have end faces formed by cleaved surfaces. These optic sections are joined on a top surface of the cantilevered so as to be in optical alignment. Initial registration of the optic fiber sections need not be perfect. In the best mode embodiment it is sufficient that optic fiber sections are initially in substantial optical alignment.

If a sufficient volume of air enters the chamber through the entrance aperture, a pressure differential will develop across the inside of the chamber and the outside beneath the acoustic reed. This pressure difference exerts a force on the acoustic reed, causing it to deflect down into and through the exit aperture. As the reed is deflected through the flow chamber, the impedance presented by the reed to the air inside the chamber is greatly reduced. The force on the reed is removed as the pressure drop vanishes. The internal spring tension of the reed then moves it back up into the chamber where the process is repeated. The reed oscillates with a frequency that is a function of the overall parameters of the reed including its length, width and mass.

As hereinafter described in FIG. 3, the insertion loss between optic fiber section 56 and section 58 is modulated by the movement of the reed. A periodic change in insertion loss results from a periodic change in optical alignment of the optic fiber sections.

Coupler 64 provides a channel for air to flow into the displacement means. Accumulator 70 is needed to provide an acoustic impedance buffer to the displacement means to create the acoustic conditions required for reed oscillation.

FIG. 3 is a view partially in section and partially in perspective of the displacement means 52 of FIG. 2. Optical sections 56 and 58 are disposed on the reed substantially along an alignment groove, not visible in the figure, that is machined into the reed. The two optic fiber sections are mounted such that end faces 72 and 74, which are perpendicular to the direction of propagation of optical signal, are in substantial optical alignment.

Index matching cement 76 is placed on the optic fiber section and the acoustic reed at the junction of the optical sections. The cement should be selected from one of the types known in the art; both for fastening the optic fiber section to the reed and for lowering insertion loss between fiber sections.

Slight variations from exact physical alignment of the optical sections result in less than complete coupling of the optical signal from one optical section to another. Consequently, the optical signal suffers a loss of intensity as it traverses from one fiber optic section to another. As illustrated in FIG. 4, the insertion loss at the end faces of the optic fiber sections can be altered in at least three ways. The optic fiber sections 78, 80 can be laterally offset as seen in FIG. 4A. The optic fiber sections can be tilted at some angle (FIG. 4B) or the fiber sections can be displaced a finite distance (FIG. 4C). Any and all of these mechanisms produces some change in the insertion loss at the junction of the optic sections. The transducer of the present invention modulates the optical signal propagating through the optic fiber sections by increasing insertion loss through any one or any combination of these three mechanisms. The periodic motion of the reed induced by airflow through the displacement means causes a periodic change in the insertion loss in the optic fiber at the same frequency as that of the acoustic reed.

FIG. 5 is a detailed block diagram of the detector means 50 of the airflow detection system of FIG. 1. Phototransistor 82 receives the modulated optical signal and converts it into a corresponding electrical signal. Signal amplifier 84 of a type known in the art provides any neccessary amplification to the signal before sending it on lines 86 to an active bandpass filter 88 of a type well known in the art. Decoder 90 receives the output of the bandpass filter. In the best mode embodiment, a standard No. 567 tone decoder is used to detect the presence of a signal output from the bandpass filter.

Those skilled in the art will note that an equivalent decoder could also be used. The pass bands of the filter are selected to correspond to the vibration frequencies of the reeds of individual sensors outlined hereinbefore in FIG. 2. When an individual sensor is activated by airflow a corresponding signal will be passed through decoder 90 to logic signal generator 92, and on to additional processing if desired.

It will be noted by those skilled in the art that the present invention encompasses the detection of fluid movement in general and is not limited to airflow.

Similarly, although the invention has been shown and described with respect to a best mode embodiment thereof, it should be understood by thse skilled in the art that various other changes, omissions and additions thereto may be made therein without departing from the spirit and scope of the invention.

We claim:

1. A sensor, for providing an optical signal indicative of the presence of fluid flow in a plenum, in a system having an optical signal detector and optical signal source, comprising:
   displacement means, having a chamber for receiving fluid flow from the plenum and including a cantilevered member disposed therein, said cantilevered member oscillating at a sensor characteristic frequency in response to fluid flow through said chamber; and
   first and second optical sections having an optical surface on each end thereof, said sections arranged end to end on a major surface of said cantilevered member such that a first end of each form, in combination, an optical coupling, said coupling adapted to flex with oscillation of said cantilevered member, the opposite end of said first and second sections being optically aligned with the optical signal source and the optical signal detector, respectively, to couple optical signals from the signal source through said optical coupling to the dectector, whereby oscillation of said member in the presence of fluid flow produces an oscillatory misalignment of said optical coupling to further provide intensity modulation of such optical signals at the sensor characteristic frequency.

2. The sensor of claim 1, wherein
said chamber includes an inlet aperture for receiving fluid from the plenum and an exit aperture for discharging received fluid to the plenum, and wherein
said cantilevered member is positioned in register with said exit aperture for receiving the fluid flowing through said chamber in such a manner as to excite oscillation of said member at said sensor characteristic frequency in the presence of fluid flow.

3. The sensor of claim 2, wherein
said cantilevered member comprises an acoustic reed, said acoustic reed having a natural frequency of oscillation equal to said sensor characteristic frequency, and wherein
said chamber comprises an acoustic shallot.

4. The sensor of claim 1, wherein said first ends of said first and second optical sections forming said optical coupling are bonded to said major surface.

5. The sensor of claim 4, wherein said first ends are bonded to said major surface with cyanoacrylate cement.

6. The sensor of claim 1, wherein said optical sections comprise optic fiber material.

7. The sensor of claim 6, wherein said optical fiber material is 400 micron core glass fiber.

8. The sensor of claim 6, wherein said optical surface of said first ends of said sections are formed by cleaving said optic fiber material.

* * * * *